United States Patent [19]

Chateau

[11] 4,009,697
[45] Mar. 1, 1977

[54] AUTOMATIC IGNITION ADVANCE FOR AN INTERNAL COMBUSTION ENGINE
[75] Inventor: Louis Chateau, Rosny-sur-Bois, France
[73] Assignee: Ducellier & Cie, Paris, Cedex, France
[22] Filed: Jan. 21, 1975
[21] Appl. No.: 542,851
[30] Foreign Application Priority Data
Jan. 22, 1974 France .................. 74.02080
[52] U.S. Cl. .................. 123/117 R; 123/32 A
[51] Int. Cl.$^2$ .................................. F02P 5/04
[58] Field of Search ....... 123/117 D, 117 R, 148 E, 123/146.5 R
[56] References Cited
UNITED STATES PATENTS
3,749,073  7/1973  Asplund .................. 123/117 D
3,752,139  8/1973  Asplund .................. 123/117 D
3,757,755  9/1973  Carner ................... 123/117 D
3,831,563  8/1974  Brittain et al. ........... 123/117 D
3,853,103  12/1974  Wahl et al. .............. 123/117 D Primary Examiner—Ronald B. Cox

[57] ABSTRACT

An ignition system and a method of ignition for an internal combustion engine in which an element is rotated in association with a position detector to provide a reference signal varying in duration with engine speed. Impulses of constant frequency are produced by a generator and the impulses appearing during the duration of the reference signal are counted and coded. A further generator produces pulses as a function of induction depression and these are also counted and coded, and this coded value is corrected as a function of engine speed. The first coded value and the corrected coded value are compared and, when these coincide, an ignition spark is produced.

4 Claims, 6 Drawing Figures

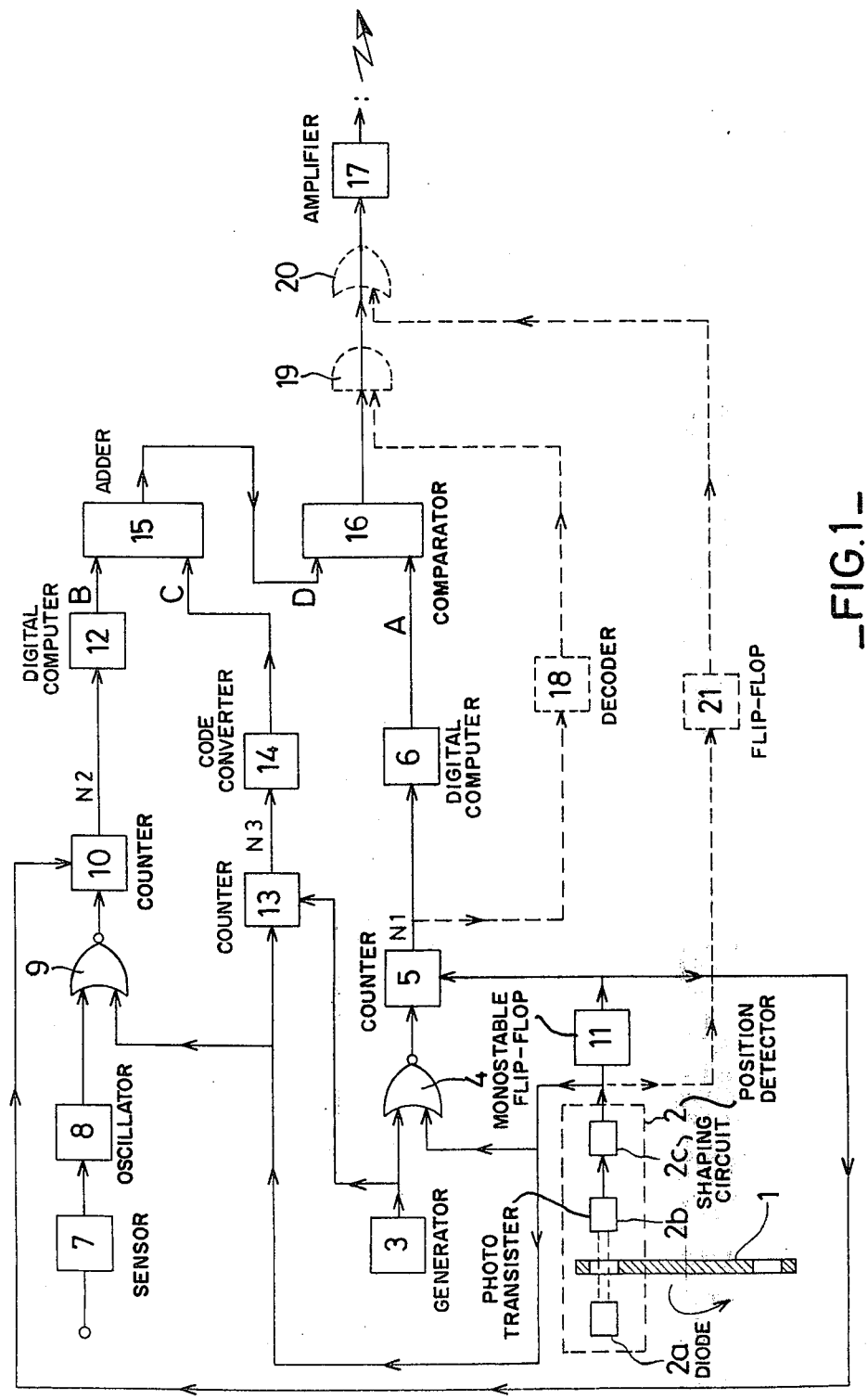
_FIG.1_

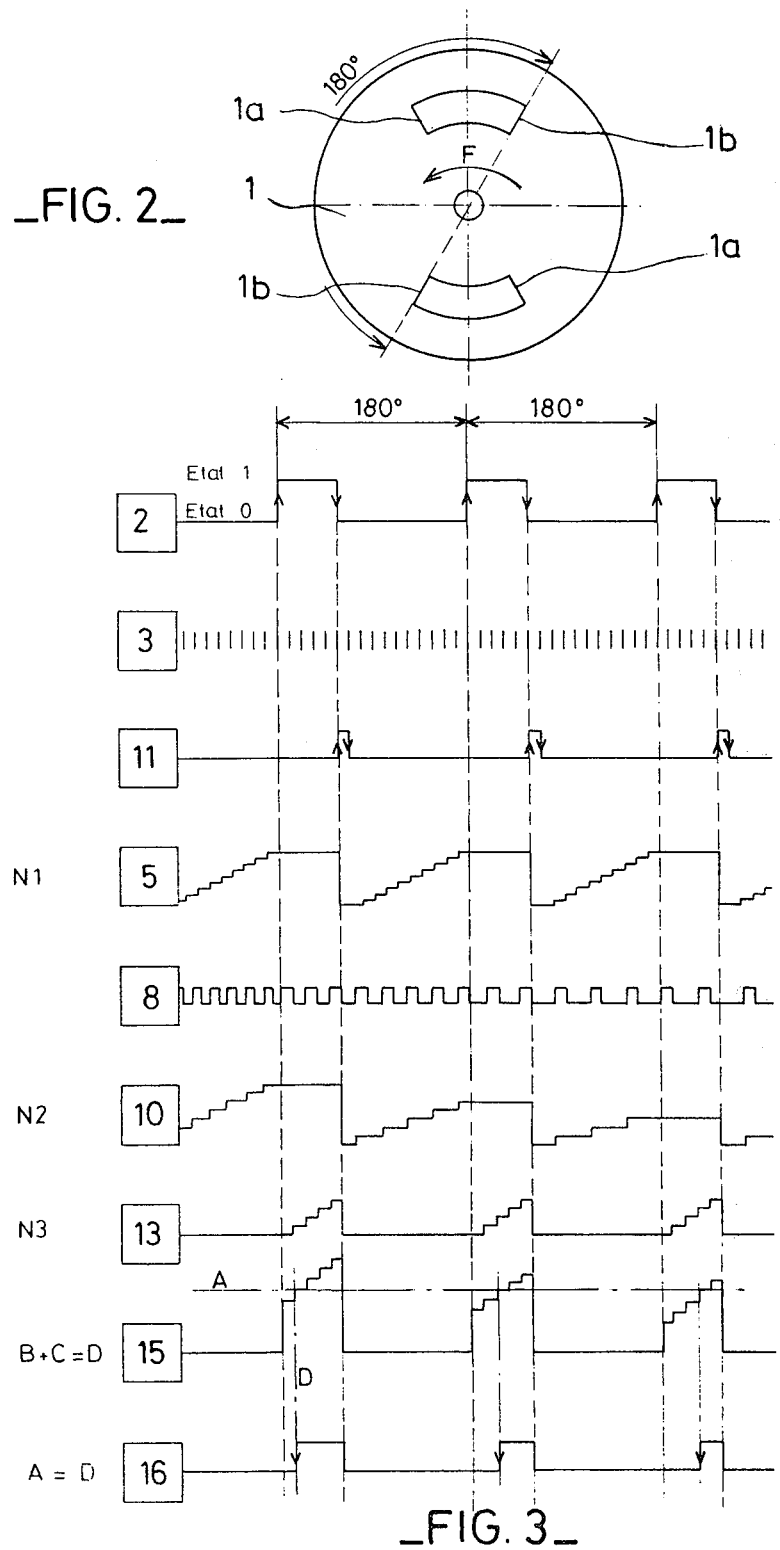

AUTOMATIC IGNITION ADVANCE FOR AN INTERNAL COMBUSTION ENGINE

This invention relates to an ignition system and a method of ignition for internal combustion engines, particularly for motor vehicles, notable in that they permit an automatic ignition advance to be obtained which is variable as a function of the speed and at least one of the operating parameters of the said engine.

Electronic devices for automatic advance are already known comprising analogue circuits which cause, for example, a voltage which is a function of the engine speed to correspond to another voltage which is a function of the angular position of the engine fly wheel with respect to a reference position. These devices are subject to considerable variations in performance according to variations of temperature or of the supply voltage.

Other known electronic devices for automatic ignition advance include logic circuits, which do not have the disadvantage of analogue circuits, such devices comprising an angular coder composed of a rotatable disc provided, for example, with 360 teeth, in such a manner as to obtain an impulse for each degree, this disc rotating so as to cut the beam of an electroluminescent diode activating a photo-transistor. These devices function in a very satisfactory manner, but they have, nevertheless, the drawback of being relatively expensive and requiring a disc diameter adapted to the power of resolution of the opto-electronic elements. These requirements can result in certain difficulties of assembly on the vehicle.

An object of the present invention is to provide an improved ignition system and method of ignition in which the aforesaid drawbacks are eliminated or avoided.

From a first aspect of the invention, there is provided a method of ignition for an internal combustion engine wherein from a first reference position taken on a rotatable element driven by the engine, there is produced a transformation of the time '$t$', variable as a function of engine speed, taken for the rotatable element to turn through a constant angle, into a coded value A following a linear or non-linear law according to the law of advance required and also of one of the operational parameters of the engine into a coded value B, and in that from a second reference position, taken also on the rotatable element, there is produced a continual transformation of the time which elapses into a coded value C, to which value is added or associated the coded value B so as to obtain a coded value D, in such a manner that, when the values A and D coincide, there is obtained an ignition control impulse which, by means of an energy amplifying element, fires the ignition spark.

From a second aspect of the invention, there is provided an ignition system for an internal combustion engine comprising a rotatable element which, associated with a position detector, delivers a rectangular reference signal of constant width and of duration '$t$' variable with the speed of rotation of the internal combustion engine, an impulse generator of constant frequency, a first gate component of which one of the inputs is connected to the output of the position detector and the other input to the output of the constant frequency impulse generator, a first counter which, by means of the first simple component, counts the number N1 of impulses issuing from the constant frequency generator during the duration '$t$' a first calculator which converts the number N1 into the coded value A, a sensor of the depression prevailing in the inlet manifold of the engine, a variable frequency impulse generator which is connected to the sensor in such a manner that its frequency is a function of the sensed value of depression, a second gate component of which one of the inputs is connected to the output of the variable frequency impulse generator and the other input to the output of the position detector, a second counter which, by means of the second gate component, counts the number N2 of impulses from the variable frequency generator during the duration '$t$', a monostable flip-flop for the return to zero of the first and second counters, a second computer which converts the number N2 between the coded value B, means for correcting the coded value B as a function of the speed of rotation of the engine, in such a manner that there is obtained a coded value D, a comparator arranged to compare the values A and D in such a manner that, when the values A and D coincide, there is obtained an ignition control impulse which, by means of an energy amplifying element, fires the ignition spark.

The invention will now be described, by way of example, with reference to the accompanying drawings in which:

FIG. 1 represents schematically a first embodiment of the ignition system of the invention adapted to a four cylinder symmetrical engine;

FIG. 2 represents schematically an embodiment of the rotatable element associated with the system of FIG. 1;

FIG. 3 represents the analogue form of the functions produced by the system of FIG. 1, for a constant speed of rotation;

Figure 4:
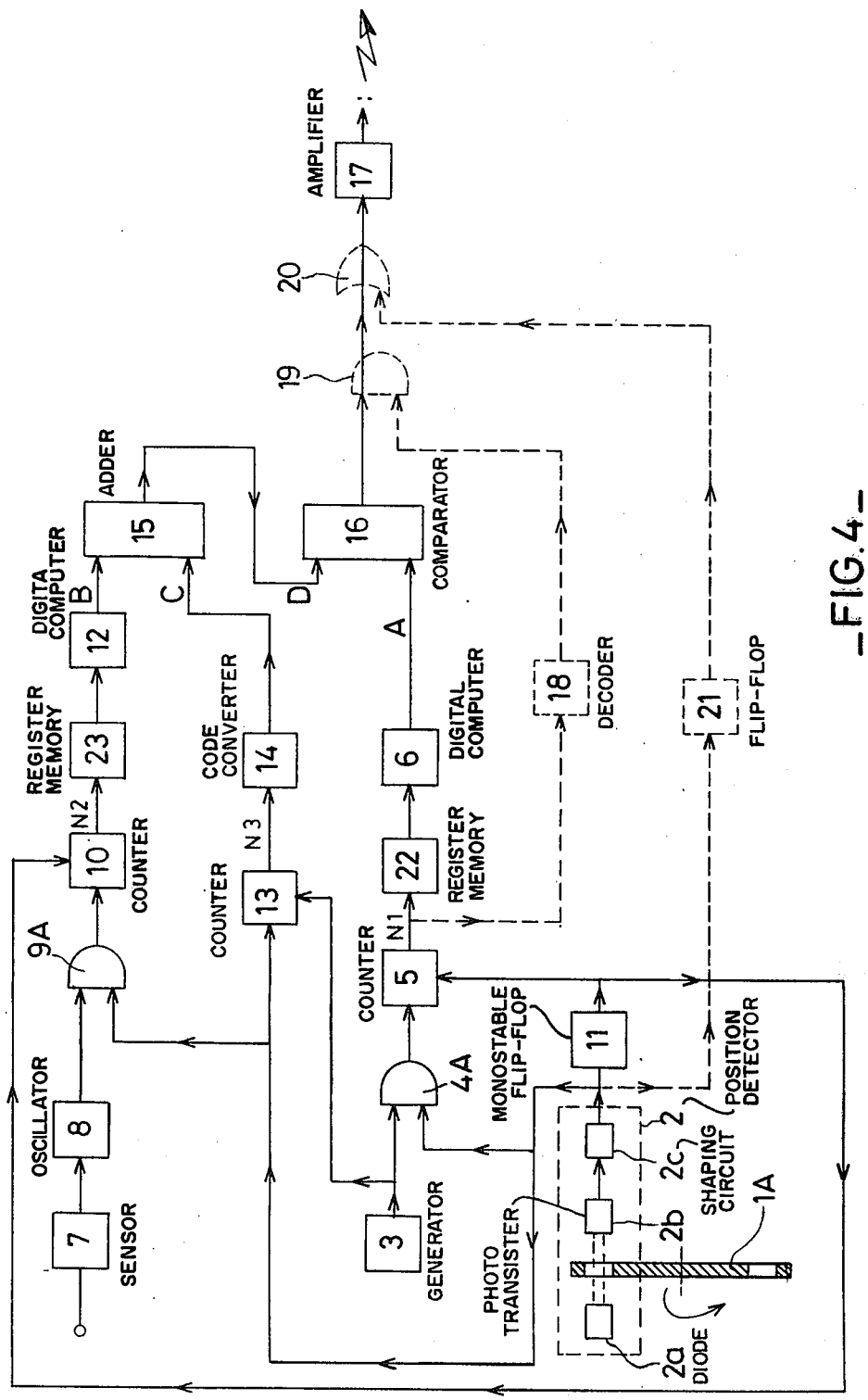
FIG. 4 represents schematically a second embodiment of the ignition system of the invention, particularly adapted to a multi-cylinder asymmetric engine.

Referring to FIGS. 1 and 2 of the drawings, these show a first embodiment of the ignition system of the invention, adapted more particularly for use with a cylinder symmetrical engine. The device comprises a disc 1 (FIGS. 1 and 2) driven, in the direction of the arrow F (FIG. 2) at the speed of the internal combustion engine (not shown). The disc 1 is provided with two symmetrically opposed openings, of which the angular width, which corresponds to the desired variation of advance, is determined by the side 1$a$ for maximum advance and by the side 1$b$ for minimum advance.

The solid part of the disc included between the side 1$a$ of one of the two openings and the side 1$b$ of the other opening determines the constant angle. The first reference position corresponds to the side 1$b$, and the second reference position to the side 1$a$. A position detector 2, composed in known manner of an electroluminescent diode 2$a$, a photo-transistor 2$b$ and a shaping circuit 2$c$, delivers a reference signal of rectangular form and of duration '$t$' proportional to the speed of rotation of the disc 1. A generator 3 delivers impulses of constant frequency when the device is supplied with voltage. A NOR gate 4 is connected by one of its inputs to the output of the position detector 2 and by its other input to the output of the generator 3.

A counter 5, by means of the NOR gate 4, counts the pulses from the generator 3 during the time 't' corresponding to the state zero (see FIG. 2) of the reference signal delivered by the position detector 2. A digital computer 6 comprising a matrix system programmed as a function of the desired advance curve, transforms the number N1 of pulses counted by the counter 5 into a coded value A, which value corresponds to the function speed of rotation of the internal combustion engine.

A sensor 7, adapted to detect the value of the depression prevailing in the inlet manifold of the engine, causes the frequency of the oscillator 8 to vary as a function of the sensed value. A NOR gate 9 is connected by one of its inputs to the output of the oscillator 8. A counter 10 counts by means of the NOR gate 9, the impulses from the oscillator 8 during the internal $t$ corresponding to the state zero (see FIG. 2) of the reference signal. A monostable flip-flop 11 controlled by the falling front of the reference signal, effects the return to zero of the counters 5 and 10. A digital computer 12, comprising a matrix system programmed as a function of the desired corrections, transforms the number N2 of impulses issuing from the counter 10 during the interval t into a coded value B corresponding to the depression function. A counter 13 functioning as a chronometer and controlled by the rising front of the reference signal counts the pulses issuing from the generator 3 during the state 1 of the reference signal.

A code converter 14 converts the number N3 of pulses from the counter 13 into a coded value C. An adder 15 combines the coded values B and C into a coded value D corresponding to a value of depression and to the time which elapses. A comparator 16 triggers an ignition control impulse when the values A and D coincide. This impulse, amplified in known manner by an energy amplifying element 17, fires the ignition spark between the electrodes of the plugs, by means of a voltage step-up coil and a distributor (not shown).

A circuit called "low speed" proves to be necessary in the case where the counter 5 does not have a sufficient counting capacity, or if the computer 6 is also of limited capacity.

This circuit comprises, in known manner, an element 18 for decoding the speed corresponding to the limit capacity of the counter 5 or of the computer 6. This decoding element 18 connected to the output of the counter 5 will be composed of simple components such as AND, OR, NOR, or NOR-AND gates and of a by-stable flip-flop of which the changes of state will be caused, on the one hand by the state of limit capacity and, on the other hand, by the monostable flip-flop 11. The output of the by-stable flip-flop, connected to one of the inputs of the AND gate 19, conditions the transmission of the information from the comparator 16 to the OR gate 20, to which is continually applied, at its other input, the minimum advance pulse by means of the monostable flip-flop 21 triggered by the descending front of the reference signal from the detector 2.

The circuits described above are arranged in such a manner that, at low speeds, the information from the comparator 16 is blocked and only the minimum advance impulse is passed through the OR gate 20. At normal speeds of use, the information from the comparator 16 passes through the AND gate 19 and the OR gate 20 which results in the creation of an ignition control pulse which is angularly variable as a function of the speed of rotation and of the depression.

It is obvious that the code converter 14 can be omitted if the counter 13 delivers directly the coded value C.

Figure 5:
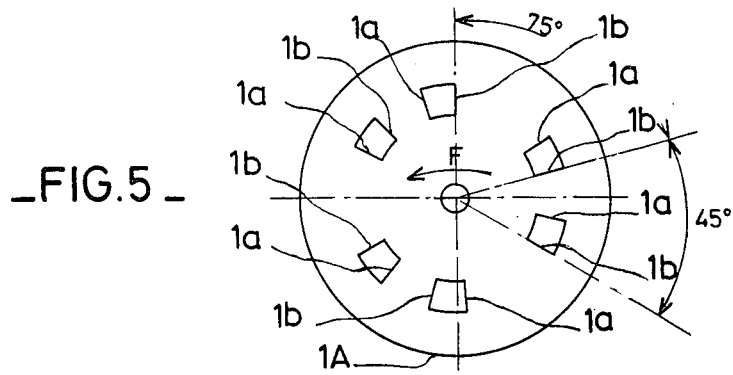
FIG. 5 represents schematically an embodiment of the rotatable element associated with the system of FIG. 4.

In the second embodiment shown schematically in FIGS. 4 and 5, the device is more particularly adapted to an asymmetric multi-cylinder engine. The disc 1A which, in this second embodiment, turns at a speed which is half that of the internal combustion engine, comprises six openings angularly spaced between themselves by 75° and 45° alternately. The angular width of the openings, identical for all the openings, determines the constant angle. The first reference position corresponds to side 1b, and the second reference position corresponds to side 1a.

Figure 6:
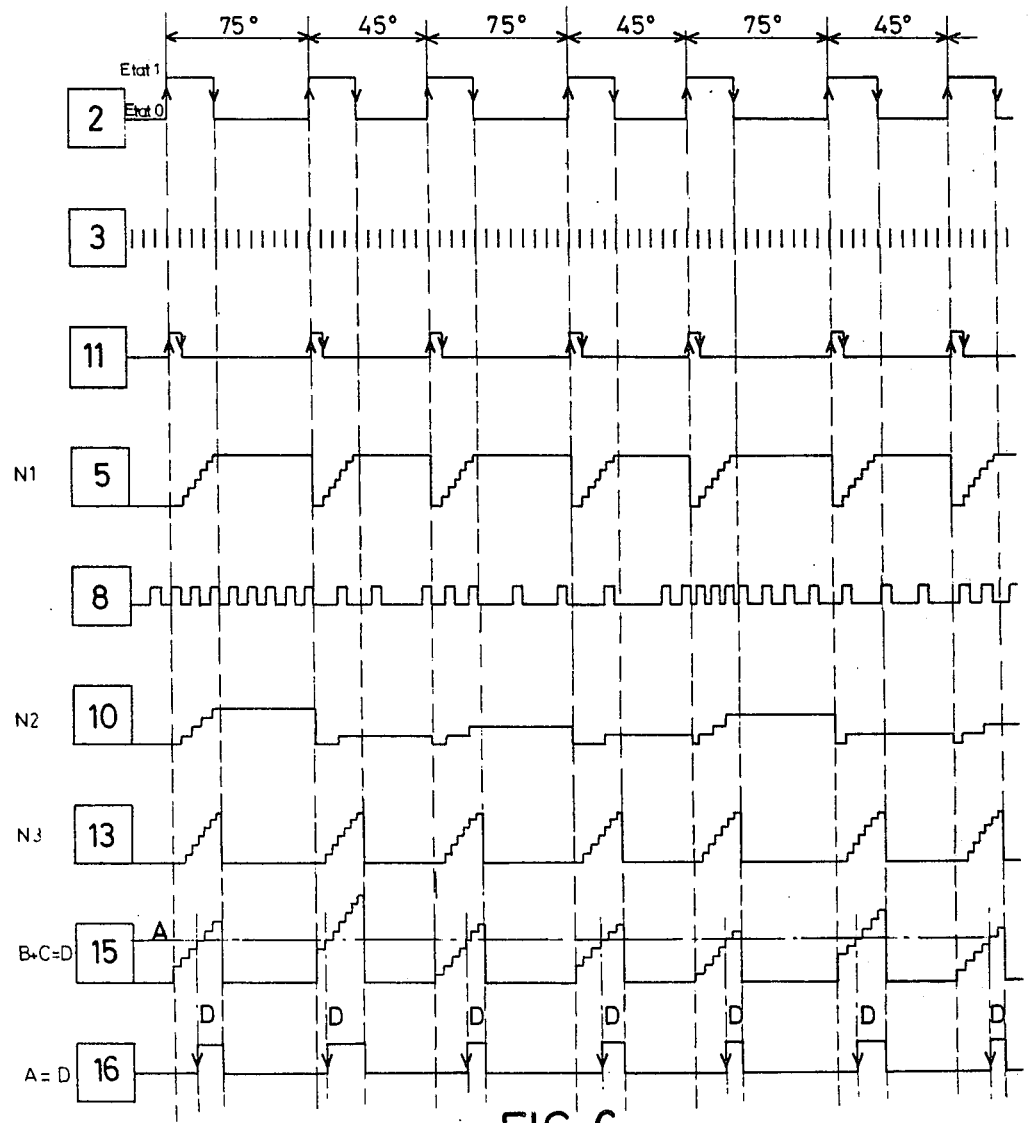
FIG. 6 represents the analogue form of the functions produced by the system of FIG. 4 for a constant speed of rotation.

Referring to FIG. 6, which is the analogue representation of the functions produced by the ignition advance device adapted to an asymmetrical engine, the number of impulses counted would be, at constant speed, different from one cylinder to the other, the angular spacing separating these two cylinders being, in the example chosen, 75° and 45° on the disc.

The counters 5 and 10 must therefore function during the state 1 (see FIG. 6) of the reference signal, which state corresponds to the width of the openings of the rotatable disc 1A. The ignition impulse is created with the aid of parameters calculated during the previous opening, which is why it is necessary to interpose a first register memory 22 between the counter 5 and the digital computer 6, and a second register memory 23 between the counter 10 and the digital computer 12 (FIG. 4). These registers are controlled by the descending front of the reference signal. The return to zero of the counters 5 and 10 is effected by the ascending front of the monostable flip-flop 11, itself fired by the ascending front of the reference signal (see FIG. 6). The memory registers 22 and 23 have not been shown in FIG. 6 because their function is well known to a man skilled in the art. The other elements of the device are identical to the two described above in the first embodiment.

The operation of the device of the first embodiment of the invention is as follows:

As soon as voltage is applied to the device, the generator 3 delivers impulses, the frequency of which is equal to 42 KHZ, this value being determined in such a manner as to have at least one impulse per degree at a speed of 7,000 revolutions per minute.

At low speeds of rotation and if the capacity of the counter 5 or of the computer 6 is relatively limited, the state corresponding to this maximum capacity of these elements is decoded by the element 18 of the circuit called "low speed". The output signal of the element 18 is applied to one of the inputs of the AND gate 19, the other input of the said gate is connected to the output of the comparator 16. The output of the AND gate 19 is connected to one of the inputs of the OR gate 20, of which the other input is connected to the output of the monostable flip-flop 21 fired by the descending front of the reference signal. AS has been seen above, the information from the comparator 16 is blocked at low speeds of rotation and only the signal corresponding to minimum advance passes through the OR gate 20.

For higher speeds, the information of the comparator passes through the AND gate 19 and the OR gate 20.

At normal speeds of use, that is to say for all the speeds of rotation for which the number N1 of impulses is lower than the maximum capacity of the counter 5 or than the conversion power of the computer 6, the impulses from the generator 3 are counted by the counter 5, by means of the NOR gate 4, during the duration $t$ of the reference signal from the position detector 2, which duration is determined by the ascending and descending fronts to the said signal.

The return to zero of the counter 5 is controlled by the ascending front of the monostable flip-flop 11 triggered by the descending front of the reference signal. The counter 5 retains in its memory the number N1 of pulses during the corresponding part of the state 1 of the reference signal. The conversion of the number N1 by the calculator 6 to the coded value A is effected during the state 1 of the reference signal so as to avoid erratic operation due to conduction and radiation interference. The depression sensor 7 controls the frequency variations of the oscillator 8. The counter 10, by means of the NOR gate 9, counts the number N2 of impulses from the oscillator 8 during the duration t of the reference signal. The return to zero of the counter 10 is effected by the ascending front of the monostable flip-flop 11. The cessation of counting and the placing in the memory are controlled by the state 1 of the reference signal.

The conversion of the number N2 by the calculator 12 to the coded value B is effected during the state 1 of the reference signal.

In the foregoing, it will be seen that the number N2 varies with the value of the depression and with the speed of rotation of the disc 1. If it is assumed, for example, that the depression is of constant value, the oscillator 8 will then deliver impulses of constant frequency. Since the impulses are counted during the duration '$t$' corresponding to the state of the reference signal. If the speed of rotation increases, t diminishes and N2 diminishes. At a constant value of depression the angle of advance will thus vary only with the speed and, at constant speed, the angle of advance will vary only with the depression.

It is clear that if the correction of depression is of non-linear form, the frequency variation of the oscillator 8 will be obtained from a non-linear sensor such as a logarithmic potentiometer for example.

It will be noted, however, that with a value of depression which is practically nil, since the frequency of the oscillator 8 is not nil, there will necessarily be a slight displacement of the point of advance, but the use of a computer enables this displacement to be cancelled by inhibition so as to be within the minimum value.

In the second embodiment, the operation of the device is identical, but since the cycle for an asymmetric engine is only repeated for every two revolutions of the engine, the disc is driven at a speed which is half that of the motor. On the other hand, the angular spacing separating two consecutive cylinders does not have the same angular value and it is important to calculate the parameters speed of rotation and depression during the state 1 of the reference signal, which implies a transfer in the memory registers and the replacement of the NOR gates 4 and 9 by the AND gates 4A and 9A.

It is understood that numerous modifications can be made to the embodiments described above without departing from the scope of the invention. It is thus notable that the coded values A and B can be associated in order to obtain advance curves which do not run parallel with each other by replacing the adder of the coded values A and D by an element adapted to associate the said coded values A and B.

I claim:

1. A method of controlling ignition timing in an internal combustion engine having a shaft, comprising: generating a first digital signal as a function of the time taken for the shaft to rotate through a constant angle from a first reference position, said first signal varying with the shaft speed in accordance with the required speed/advance characteristic for the engine; generating in said same time a second digital signal corresponding to the value of another operational parameter of the engine; generating a third digital signal increasing continuously with the time elapsed after the shaft passes through a second reference position; adding together the second and third digital signals to derive a fourth digital signal; and generating a spark-triggering pulse when the first and fourth digital signals are equal.

2. In an internal combustion engine ignition system, an ignition timing control arrangement comprising: engine shaft position detector means producing first and second output signals indicating when the engine shaft is in first and second reference positions respectively, first digital signal generating means connected to said detector means and sensitive to said output signals to generate a first digital signal corresponding to the time taken for the engine shaft to be rotated between said reference positions, second digital signal generating means connected to said detector means and sensitive to said output signals and to another engine operating parameter to generate a second digital signal corresponding to said other engine operating parameter, third signal generating means connected to said detector means and sensitive to said second reference signal to produce a third digital signal continuously increasing with the time elapsed since the production of said second reference signal, digital adder means connected to the first and third digital signal generator means and producing a fourth digital output signal equal to the sum of the second and third digital signals, and digital comparator means connected to the first digital signal generating means and to the digital adder means and producing a spark triggering output pulse when the fourth digital output signal of the digital output means and the first digital signal coincide.

3. An ignition timing control arrangement according to claim 2, comprising: a first counter for counting the number of impulses issuing from said first digital signal generating means, a first calculator converting said number of impulses into a first coded value, a second counter for counting the number of impulses issuing from said second digital generating means, a monostable flip-flop for returning said first and second counters to zero, a second calculator for converting the number of impulses issuing from said second digital signal generating means into a second coded value.

4. An ignition timing control arrangement according to claim 3, comprising: a first memory register interposed between said first counter and said first calculator, and a second memory register interposed between said second counter and said second calculator.

* * * * *